(12) United States Patent
Yamasaki

(10) Patent No.: US 11,975,535 B2
(45) Date of Patent: May 7, 2024

(54) PRINTING SYSTEM, CONTROL METHOD FOR PRINTING DEVICE, AND STORAGE MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 130 days.

(21) Appl. No.: 17/570,220

(22) Filed: Jan. 6, 2022

(65) Prior Publication Data

US 2022/0227128 A1 Jul. 21, 2022

(30) Foreign Application Priority Data

Jan. 18, 2021 (JP) .................................. 2021-005748

(51) Int. Cl.
*B41J 2/045* (2006.01)

(52) U.S. Cl.
CPC ....... *B41J 2/04536* (2013.01); *B41J 2/04586* (2013.01)

(58) Field of Classification Search
CPC ........ B41J 2/2117; B41J 11/008; B41J 3/407; B41J 2/04536; B41J 2/04586
See application file for complete search history.

(56) References Cited

U.S. PATENT DOCUMENTS

2012/0056922 A1* 3/2012 Yoshida ................. B41J 2/2107
347/105

FOREIGN PATENT DOCUMENTS

| JP | 2011-232848 A | 11/2011 |
|----|---------------|---------|
| JP | 2013-067127 A | 4/2013 |
| JP | 2014-050565 A | 3/2014 |
| JP | 2014-183335 A | 9/2014 |
| JP | 2016-112840 A | 6/2016 |
| JP | 2017-044940 A | 3/2017 |
| JP | 2019-074620 A | 5/2019 |
| JP | 2019-098099 A | 6/2019 |

OTHER PUBLICATIONS

JPO; Application No. 2021-005748; Notice of Reasons for Refusal dated Jan. 17, 2023.
JPO; Application No. 2023-098166; Notification of Reasons for Refusal dated Mar. 5, 2024.

* cited by examiner

*Primary Examiner* — Thinh H Nguyen
(74) *Attorney, Agent, or Firm* — Fitch, Even, Tabin & Flannery LLP

(57) ABSTRACT

Disclosed is a printing system including at least one processor and a print head which performs printing on a printing target. The processor sets an application amount of a base ink to be applied to the printing target according to a design to be printed on the printing target by the print head, and controls the print head to apply the base ink to the printing target based on the set application amount of the base ink.

9 Claims, 4 Drawing Sheets

| DESIGN | BASE DENSITY SETTING VALUE |
|---|---|
| A | 100 |
| B | 200 |
| C | 300 |

| REFERENCE DENSITY VALUE | BASE DENSITY SETTING VALUE |
|---|---|
| LESS THAN 30 | 300 |
| 30-60 | 200 |
| 60-90 | 100 |
| 90 OR GREATER | 50 |

| REFERENCE DENSITY VALUE | BASE DENSITY SETTING VALUE |
|---|---|
| 0 | 300 |
| 30 | 200 |
| 60 | 100 |
| 100 | 50 |

PRINTING SYSTEM, CONTROL METHOD FOR PRINTING DEVICE, AND STORAGE MEDIUM

CROSS-REFERENCE TO RELATED APPLICATION

This application is based upon and claims the benefit of priority from the prior Japanese Patent Application No. 2021-005748, filed on Jan. 18, 2021, the entire contents of which are incorporated herein by reference.

BACKGROUND

Technical Field

The present disclosure relates to a printing system, a control method for a printing device, and a storage medium.

Description of Related Art

Conventionally, there are known printing devices that print designs on printing targets such as person's fingernails, toenails and the like by ejecting light transmissive inks as in JP 2013-67127 A.

In this type of printing device, base printing is sometimes performed on the nails with a white ink or the like in advance and color printing (design printing) is performed with color inks. In the base printing, the amount of white ink or the like to be applied is set to a certain value in order to obtain a base with a predetermined density such that color inks produce colors.

SUMMARY

According to an aspect of the present disclosure, there is provided a printing system including: at least one processor; and a print head which performs printing on a printing target, wherein the processor sets an application amount of a base ink to be applied to the printing target according to a design to be printed on the printing target by the print head, and controls the print head to apply the base ink to the printing target based on the set application amount of the base ink.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein:

FIG. 5 is a view showing a modification example of the base density table in the embodiment; and FIG. 6 is a view showing another modification example of the base density table in the embodiment.

DETAILED DESCRIPTION OF EMBODIMENTS

An embodiment of a printing device according to the present disclosure will be described with reference to FIGS. 1 to 6.

The embodiment described below is provided with various limitations technically preferable for carrying out the present disclosure. However, the scope of the present disclosure is not limited to the embodiment below or illustrated examples.

Furthermore, in the following embodiment, a case where the printing device is a nail printing device that performs printing on fingernail(s) (including thumbnail(s)) of hand(s) as a printing target will be described as an example. However, the printing target of the printing device in the present disclosure is not limited to the fingernail(s) or the thumbnail(s) of hand(s). For example, toenail(s) of foot (feet) may be the printing target. The printing target may also be targets other than nails, such as nail tips and surfaces of various accessories.

Figure 1:
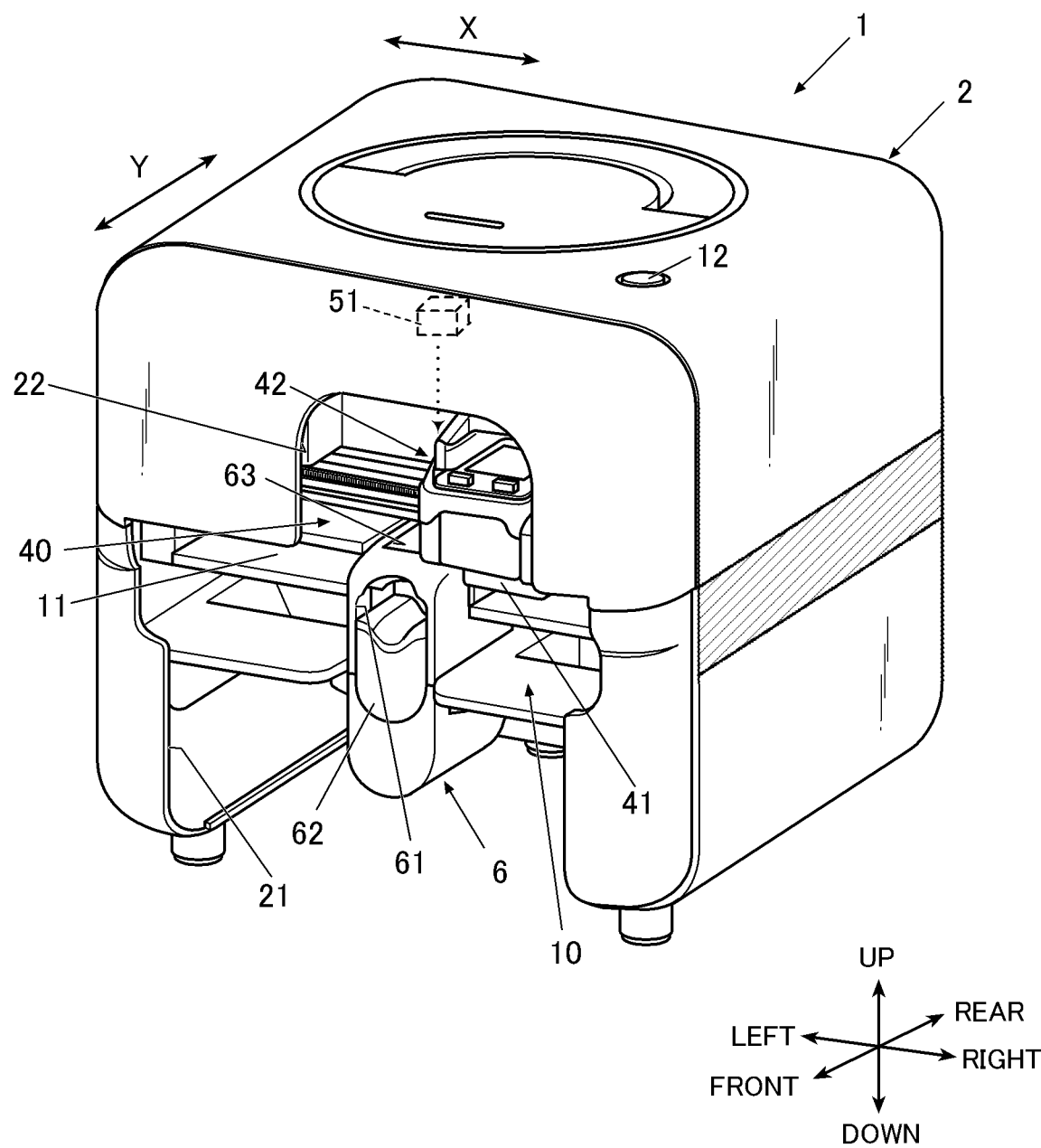
FIG. 1 is a perspective view showing a main part outer configuration of a nail printing device in an embodiment.

FIG. 1 is a perspective view showing the main part outer configuration of a nail printing device 1.

In the following embodiment, the up, down, left, right, front and rear refer to the directions shown in FIG. 1. Furthermore, the X direction and the Y direction respectively refer to the left-right direction and the front-rear direction.

As shown in FIG. 1, the nail printing device 1 includes a housing 2 which is formed in a nearly box shape.

The housing 2 includes an opening 21 which is formed over the nearly entire surface in the left-right direction (horizontal direction of nail printing device 1, left-right direction in FIG. 1, X direction) in the lower section on the front surface side (front surface side of nail printing device 1, front side in FIG. 1). There is a cut-off portion 22 continuing to the upper side of the opening 21, in the nearly central portion in the left-right direction of the housing 2. The cut-off portion 22 functions as a port when an after-mentioned print head 41 is attached to and detached from the device.

Though not shown in the drawings, the housing 2 may include a cover member or the like which covers the opening 21 and the cut-off portion 22. The cover member may be a separate member from the housing 2, or may be attached to the housing 2 via a hinge or the like in an openable and closable manner, for example.

An operation unit 12 of the nail printing device 1 is provided on the upper surface (top plate) of the housing 2. The operation unit 12 is an operation button (power switch button) to turn on/off the power of the nail printing device 1, for example. When the operation unit 12 is operated, the operation signal is output to an after-mentioned control device 80, and the control device 80 performs control in accordance with the operation signal to operate the components of the nail printing device 1. For example, when the operation unit 12 is a power switch button, the power of the nail printing device 1 is turned on/off according to the button operation.

The components of the nail printing device 1 may operate in accordance with the operation signal which was input from an operation unit 91 of an after-mentioned control device 9 instead of the operation unit 12.

The shapes, arrangement and the like of the components in the housing 2 are not limited to the illustrated examples, and can be set as needed. For example, the operation unit 12 may be provided on a lateral surface, a back surface or the like, not on the upper surface of the housing 2. The housing 2 may have other various operation buttons as the operation unit 12, and may have various displays, indicators and the like.

A device body 10 is contained inside the housing 2.

The device body 10 includes a base 11, a printing unit 40 and a finger fixing unit 6 attached to the base 11, for example.

The finger fixing unit 6 is arranged in the nearly central portion in the left-right direction (X direction) on the device front surface side in the base 11. The finger fixing unit 6 fixes, in the region suitable for the printing, the finger (printing finger) having the nail which is the printing target in the present embodiment.

The finger fixing unit 6 has an opening 61 on the device front surface side. A finger fixing member 62 is provided inside the finger fixing unit 6. The finger fixing member 62 presses up and supports the finger, which is inserted from the opening 61, from the lower side. The finger fixing member 62 is formed of a resin or the like having flexibility, for example.

The upper surface of the finger fixing unit 6 has a window 63 to expose the nail portion of the finger which was inserted from the opening 61 and is held by the finger fixing member 62.

The printing unit 40 is a printing unit that performs printing on the nail which is the printing target.

Figure 2:
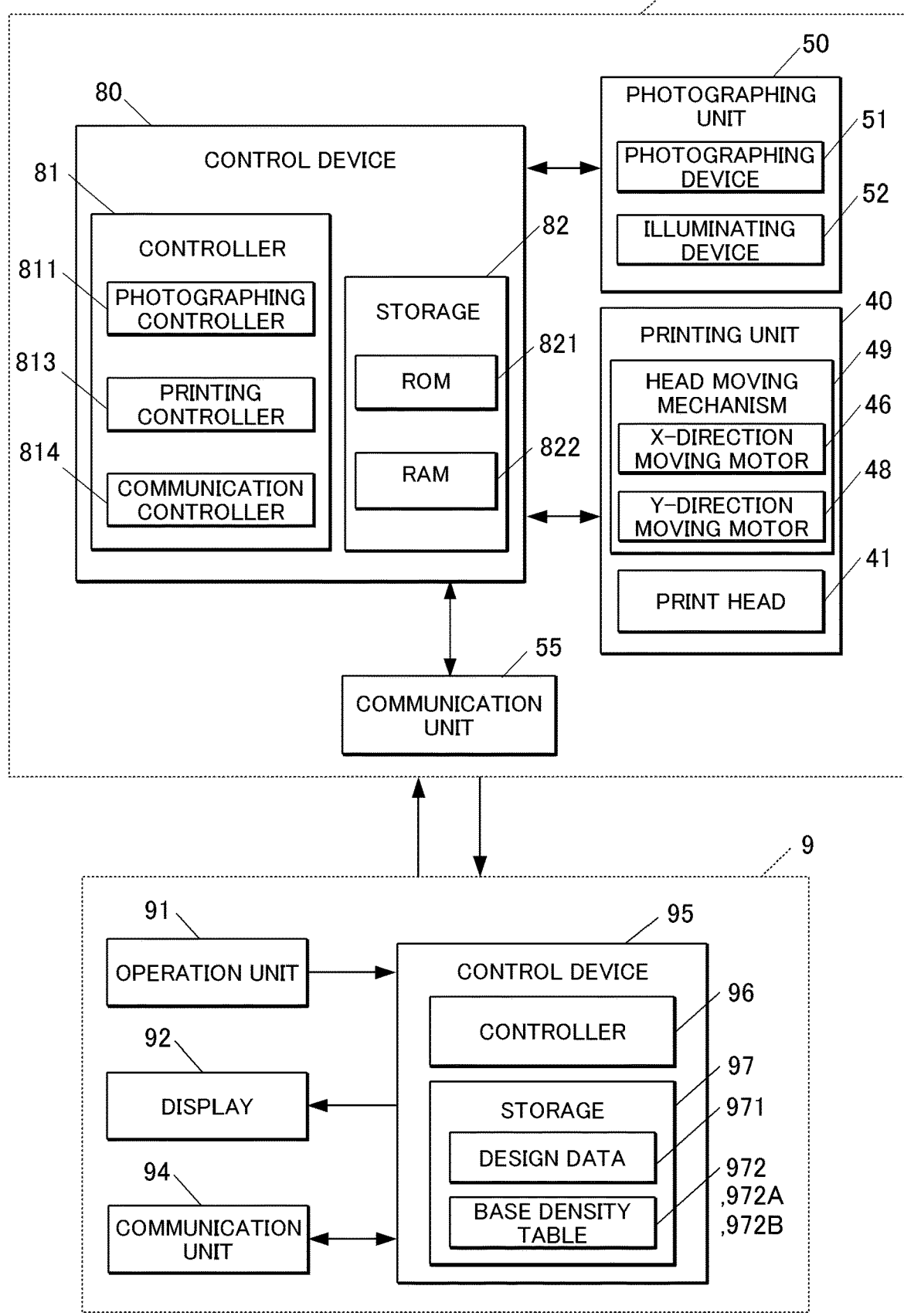
FIG. 2 is a control block diagram showing a schematic control configuration of the nail printing device and a terminal device in the embodiment.

The printing unit 40 includes a print head 41 that performs the printing operation, and a head moving mechanism 49 for moving a print head unit 42 including the print head (see FIG. 2).

In the print head 41 of the present embodiment, the surface facing the nail surface serves as the ink ejection surface including multiple nozzle openings (none of them shown in the drawings) to eject ink. The print head 41 is an inkjet type inkjet head that performs printing by making micro droplets of ink and directly spraying, from the ink ejection surface, the ink onto the nail surface which is the printing surface of the printing target (nail). Though the configuration of the print head 41 is not especially limited, the print head 41 is a cartridge-integrated head which has the ejection mechanism section such as the ink ejection surface integrated with the ink cartridge (none of them shown in the drawings), for example.

For example, the print head 41 can eject inks of C (CYAN), M (MAGENTA), and Y (YELLOW). The print head 41 in the present embodiment can also eject the ink of white color as the base ink. By printing the white base ink, it is possible to produce beautiful colors since the base color greatly influences the color tint in the inkjet printing. The type of inks provided in the print head 41 is not limited to the above type.

The head moving mechanism 49 is configured by including an X-direction moving mechanism (not shown in the drawings) for moving the print head 41 in the left-right direction (X direction) of the device, and a Y-direction moving mechanism (not shown in the drawings) for moving the print head 41 in the front-rear direction (Y direction) of the device.

The X-direction moving mechanism includes an X-direction moving motor 46 (see FIG. 2), and moves the print head 41 in the left-right direction (X direction) of the device by driving the X-direction moving motor 46. The Y-direction moving mechanism includes a Y-direction moving motor 48 (see FIG. 2), and moves the print head 41 in the front-rear direction (Y direction) of the device by driving the Y-direction moving motor 48.

At a position above the window 63 of the finger fixing unit 6 inside the upper surface (top plate) of the housing 2, there is provided a photographing unit 50 that photographs the nail (finger including the nail) exposed from the window 63 and obtains an image of the nail (image of the finger including the nail, hereinafter, referred to as a "nail image").

The photographing unit 50 includes a photographing device 51 such as a camera and an illuminating device 52 which illuminates the nail that is the photographing target and includes a white LED, for example (see FIG. 2).

The photographing device 51 is, for example, a small-sized camera configured by including a CCD (Charge Coupled Device) type or CMOS (Complementary Metal Oxide Semiconductor) type solid imaging element which has approximately two million pixels or more and a lens.

The specific arrangement is not particularly limited as long as the photographing unit 50 is provided at a position capable of photographing the nail of the finger placed in the finger fixing unit 6. For example, the photographing unit 50 may be configured to be movable in the X and Y directions by the head moving mechanism 49 that moves the print head 41.

FIG. 2 is a control block diagram showing the schematic control configuration of the nail printing device 1 and an after-mentioned terminal device 9.

As shown in FIG. 2, the nail printing device 1 includes a communication unit 55 and a control device 80, in addition to the printing unit 40 and the photographing unit 50 described above.

The communication unit 55 is configured to be able to transmit and receive information to and from the after-mentioned terminal device 9 that operates in cooperation with the nail printing device 1.

The communication between the nail printing device 1 and the terminal device 9 is performed by, for example, a wireless LAN. The communication between the nail printing device 1 and the terminal device 9 is not limited to this, and any method may be used. For example, a network line such as the Internet may be used, or wireless communication based on a near field wireless communication standard such as Bluetooth (registered trademark) or Wi-Fi may be performed. Furthermore, this communication is not limited to wireless communication, and various types of data may be transmitted and received between the nail printing device 1 and the terminal device 9 by wired connection. The communication unit 55 includes an antenna chip or the like corresponding to the communication method of the terminal device 9.

The control device 80 is a computer that includes: a controller 81 configured by including at least one processor such as a CPU (Central Processing Unit) not shown in the drawings; and a storage 82 configured by including a ROM (Read Only Memory) 821, a RAM (Random Access Memory) 822, and the like.

The storage 82 stores various programs and various types of data for operating the nail printing device 1.

Specifically, the ROM 821 of the storage 82 is a non-transitory storage medium that stores various programs such as a printing program for performing printing processing, for example. These programs are executed by the control device 80. Thereby, the components of the nail printing device 1 are controlled in an integrated manner.

The controller 81 includes functional sections such as a photographing controller 811, a printing controller 813, and a communication controller 814. The functions of these respective functional sections are realized by the cooperation of the CPU of the controller 81 and the program stored in the ROM 821 of the storage 82.

The photographing controller 811 controls the photographing device 51 and the illuminating device 52 of the photographing unit 50, and causes the photographing device 51 to photograph an image of the finger (nail image) including an image of the nail of the printing finger fixed to the finger fixing unit 6.

The image data of the nail image acquired by the photographing unit 50 is transmitted to the after-mentioned terminal device 9 via the communication unit 55. The image data may be stored in the storage 82.

The printing controller 813 outputs a control signal to the printing unit 40 on the basis of printing data transmitted from the terminal device 9, and controls the X-direction moving motor 46 and the Y-direction moving motor 48, the print head 41, and the like of the printing unit 40 so as to perform printing on the nail according to the printing data.

The communication controller 814 controls the operation of the communication unit 55. In the present embodiment, the communication controller 814 controls communication with the terminal device 9, to receive printing data or the like when the printing data or the like is transmitted from the terminal device 9.

The nail printing device 1 in the present embodiment is configured to be able to communicate with the terminal device 9, and executes the printing operation and the like on the basis of the operation instruction from the terminal device 9.

The terminal device 9 is, for example, a mobile terminal such as a smartphone or a tablet. However, the terminal device 9 is not particularly limited as long as the terminal device 9 can communicate with the nail printing device 1. For example, the terminal device 9 may be a notebook or stationary personal computer, a terminal device for a game, or the like.

Specifically, the terminal device 9 includes an operation unit 91, a display 92, a communication unit 94, a control device 95, and the like.

The operation unit 91 can perform various inputs and settings according to user operations. When the operation unit 91 is operated, an input signal corresponding to the operation is transmitted to the control device 95. In the present embodiment, a touch panel is integrally provided on the surface of the display 92, and the user can perform various input/setting operations and the like by touch operations on the touch panel.

The operation unit 91 for performing various input/setting operations and the like is not limited to the touch panel. For example, various operation buttons, a keyboard, a pointing device, and the like may be provided as the operation unit 91.

In the present embodiment, the user can select a nail design to be printed on the nail by operating the operation unit 91.

The touch panel configured in the display 92 displays various display screens under the control of a controller 96 to be described later.

In the present embodiment, the display 92 can display a nail design which was input or selected by the user from the operation unit 91, an image which was transmitted from the nail printing device 1, and the like.

The communication unit 94 can transmit printing data to the nail printing device 1. Furthermore, when data such as a nail image is transmitted from the nail printing device 1, the communication unit 94 receives the transmitted data. The communication unit 94 includes a wireless communication module that can communicate with the communication unit 55 of the nail printing device 1.

The communication unit 94 may be any communication unit as long as the communication unit can communicate with the nail printing device 1, and a communication unit that meets the communication standard of the communication unit 55 of the nail printing device 1 is applied as the communication unit 94.

The control device 95 is a computer that includes: a controller 96 configured by including at least one processor such as a CPU (Central Processing Unit) not shown in the drawings; and a storage 97 configured by including a ROM (Read Only Memory) and a RAM (Random Access Memory) not shown in the drawings.

The controller 96 controls the operations of respective components of the terminal device 9 in an integrated manner. The controller 96 implements various functions for performing printing on the nail in cooperation with a program stored in the storage 97.

The storage 97 stores various types of data and programs for operating the components of the terminal device 9.

Specifically, the storage 97 in the present embodiment stores various programs such as a nail print application program for performing nail printing using the nail printing device 1 in addition to an operation program for controlling the components of the terminal device 9 in an integrated manner. The control device 95 expands these programs in a working area of the storage 97 and executes the programs, for example, so that the terminal device 9 is controlled.

The storage 97 in the embodiment also stores design data 971 and base density table 972 (base ink application amount table) in advance.

The design data 971 is data of multiple nail designs (decorations), and includes CMY density information for each pixel of each nail design, and the like.

Figures 3, 4:
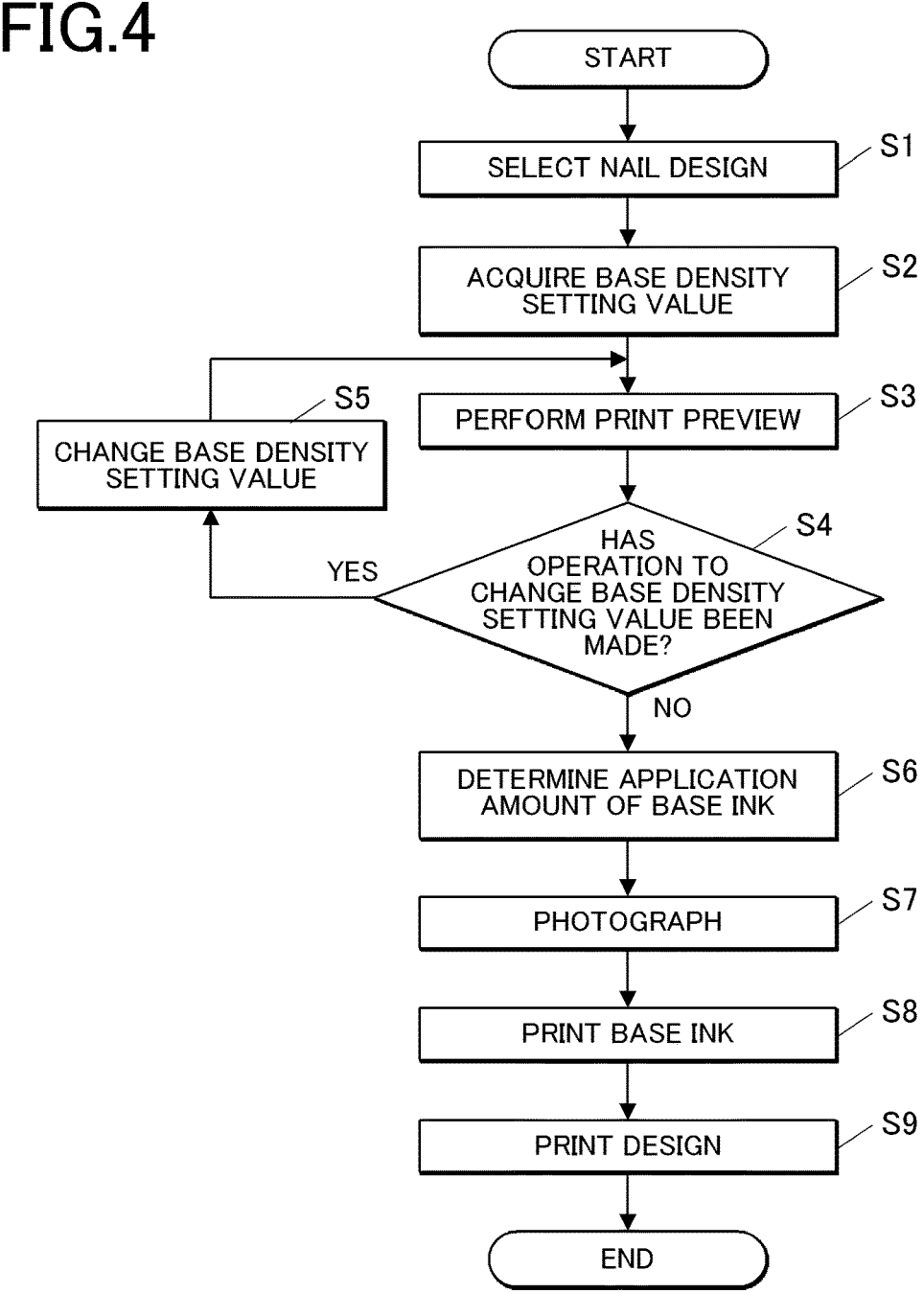
FIG. 3 is a view showing an example of a base density table in the embodiment.
FIG. 4 is a flowchart showing the flow of printing processing in the embodiment.

The base density table 972 (first base ink application amount table) is a table that associates each of at least one nail design with the base density setting value (base ink application amount setting value) of the design, as shown in FIG. 3. The base density setting value is the base density setting value when a certain reference base density (the density of the base ink which will be formed on the nail) is 100. In the example shown in FIG. 3, the rate of the application amount of base ink is set as the base density setting value. For example, if design A is selected, the base ink is printed for the application amount of 100% (for the amount of one solid printing over the entire surface), and if design B is selected, the base ink is printed for the application amount of 200% (for the amount of two solid printings over the entire surface). However, the base density setting value may be a symbol or the like instead of a numerical value, as long as the application amount of the base ink can be obtained. In the case where the value of base density is proportional to the application amount of base ink (including the case where the value is not proportional but the slight deviation in the value does not affect the print quality), the application amount of base ink may be used instead of the base density setting value. The base density table 972 may also be included in the design data 971.

Next, the operation of nail printing device 1 when printing on nails is performed will be described.

FIG. 4 is a flowchart showing the flow of printing processing of the nail printing device 1.

As shown in this FIG. 4, when the printing processing is executed, the controller 96 of the terminal device 9 first selects a nail design based on the user operation (step S1). In this step, the controller 96 displays images of multiple nail designs in the design data 971 on the display 92. The user operates the operation unit 91 to select the desired nail design from among the displayed multiple design images.

Next, the controller 96 acquires the base density setting value (step S2).

In this step, the controller 96 reads the base density table 972 from the storage 97, and acquires and sets the base density setting value corresponding to the nail design selected in step S1 from the base density table 972.

As long as the base density setting value is set, the base density setting value does not have to be corresponding to the nail design. For example, the base density setting value may be corresponding to (the density of) the nail color as described below.

Next, the controller 96 previews, on the display 92, the nail design having the base ink printed (applied) at the base density setting value which was set (step S3).

Next, the controller 96 judges whether or not the operation to change the base density setting value has been made based on the user operation (step S4).

In this step, while looking at the previewed nail design, if the user wants to change the color tint or translucency of the design, for example, to make it clearer or more transparent, the user operates the operation unit 91 to increase or decrease the base density from the setting value.

If it is judged that the operation to change the base density setting value has been made (step S4; Yes), the controller 96 changes the base density setting value according to the user operation (step S5). Thereafter, the controller 96 shifts the process to above step S3 to preview the nail design having base ink printed (applied) at the changed base density setting value.

In step S4, if it is judged that the operation to change the base density setting value has not been made (step S4; No), the controller 96 determines the application amount of base ink from the set base density setting value (step S6). The information on the determined application amount of base ink is transmitted to the nail printing device 1 through the communication unit 94.

Next, the controller 81 of the nail printing device 1 controls the photographing unit 50 to photograph the nail of the finger (printing finger) placed on the finger fixing unit 6 by the user (step S7). The controller 81 acquires the nail image of the printing finger by this photographing, recognizes (detects) the shape of the nail (nail region) from this nail image, and stores it in the storage 82.

Next, the controller 81 prints (applies) white base ink (white ink) to the printing finger (step S8).

In this step, the controller 81 controls the printing unit 40 to print (apply) the base ink to the preset printing region (region to which the nail design is to be applied) in the nail region recognized in step S7. The range of the base region to which the base ink is to be printed (applied) is not limited; the range can be all or part of the nail, and does not have to one-to-one correspond to the detected nail region.

After printing (applying) the base ink, drying of the base ink and application of a receptive layer for color inks on the base ink may be performed as necessary. If the printing finger is removed from the finger fixing unit 6 when these processes are performed, the nail image may be acquired by photographing the nail of the printing finger again with the photographing unit 50 when the printing finger is placed on the finger fixing unit 6 again, to recognize the white base region.

Next, the controller 81 generates printing data based on the nail design data so that the predetermined design printing is executed for the printing region (base region), and executes the design printing by the printing unit 40 (step S9).

After that, the controller 81 ends the printing processing.

As described above, according to the embodiment, the density (application amount) of the base ink for the nail design is set, and the base ink is printed (applied) based on this density (application amount) of the base ink.

Thus, the appearance such as color tint and translucency, which changes by the density (application amount) of the base ink, can be made suitable.

According to the embodiment, the density (application amount) of the base ink is set based on the nail design, and the base ink is printed (applied) based on this density (application amount) of the base ink.

This allows the base ink to be printed (applied) at the application amount corresponding to the nail design. Therefore, the appearance such as color tint and translucency, which changes by the density (application amount) of the base ink, can be made suitable for the design.

In addition, a relatively large amount of base ink has been conventionally applied in order to produce beautiful colors even for light-colored design printing, and this amount has been used as the standard. Therefore, in the case of design printing of dark colors, where the influence of the base is relatively small, a wasteful amount of base ink has been applied. In the embodiment, the base ink is applied at the density (application amount) corresponding to the design, which saves the base ink and thus reduces the printing time for the amount of time for applying the saved base ink compared to conventional methods.

Furthermore, according to the embodiment, the nail design having the base ink printed (applied) at the set base ink density (application amount) is previewed on the display, and the user can change the density (application amount) of the base ink while looking at the preview.

Accordingly, the user can easily adjust the appearance of the nail design such as color tint and translucency to the desired appearance.

Though the embodiment of the present disclosure has been described above, the present disclosure is not limited to the embodiment, and various modifications can be made within the scope of the present disclosure.

For example, in the embodiment, in step S2 of the printing processing, the base density setting value is obtained by using the base density table 972, which associates nail designs with respective base density setting values. However, in this step, a second base ink application amount table may be used to set the base density setting value according to the density of the nail design.

This makes it possible to set a suitable base ink density (application amount) even for the nail design for which the base density (density of base ink to be formed on the nail) has not been set, such as nail designs created by the user. Thus, the appearance such as color tint and translucency can be made suitable for this nail design, and furthermore, the base paint can be saved more compared to the conventional method where the application amount of the base paint is constant.

In this case, the controller 96 first obtains the reference density value of the selected nail design from the data of the nail design. The reference density value is calculated using the density information for each pixel contained in the design data 971. At this time, the average density value of the entire design may be used as the reference density value, the density value of the dominant region of the design (for example, the density value with the largest area) may be used as the reference density value, or the reference density values may be distributed to multiple regions according to the density distribution of the nail design. In the case of distributing the reference density values, the design region may be divided into the multiple regions by a predetermined density range of the design. The method for calculating the density of each pixel is not limited. For example, in the case of three colors of C, M and Y, the average or added value of the densities of the respective colors may be used, the average or added value of the densities of only C and M colors may be used, or the highest density of the densities of the respective colors may be used. Prior to this process, the nail region may be obtained by taking an image of the nail, and the reference density value for the design in the nail region may be obtained after fitting the nail design to the nail region.

Next, the controller 96 obtains and sets the base density setting value from the acquired reference density value of the nail design based on the base density table 972A, as shown in FIG. 5. The base density table 972A is a table that associates the range of the reference density value with the base density setting value for the range of the reference density value. The base density table 972A is stored in the storage 97 in advance. In the example of FIG. 5, the base density setting value is set such that the application amount is 300% (for the amount of three solid printings over the entire surface) when the reference density value is less than 30, the application amount is 200% (for the amount of two solid printings over the entire surface) when the reference density value is between 30 and 60 (including 30), the application amount is 100% (for the amount of one solid printing over the entire surface) when the reference density value is between 60 and 90 (including 60), and the application amount is 50% when the reference density value is equal to or greater than 90. To reduce the application amount, the number of jets may be reduced by the same rate, or the amount of each dot to jet may be reduced. In the case of increasing the application amount, instead of applying multiple layers of paint, the multi-pass method or other methods may be used to achieve an ink jet volume equivalent to multiple layers of paint.

In addition, when setting the base density setting value from the reference density value of the nail design, the base density setting value may be obtained by interpolating according to the reference density value. In this case, for example, as shown in FIG. 6, base density table 972B, which associates multiple reference density values with multiple base density setting values, is used. The base density table 972B is stored in the storage 97 in advance. Based on the base density table 972B, the base density setting value corresponding to the numerical value between two adjacent reference density values is calculated by linear interpolation. In the example of FIG. 6, for example, when the reference density value is 15, which is middle between 0 and 30, the base density setting value is linearly interpolated to 250, which is middle between 300 and 200. However, the interpolation method is not limited to the linear interpolation.

Thus, it is possible to set the density (application amount) of the base ink more suitable for the density distribution of the nail design, and to appropriately express the continuity of color tint and translucency in the portion where the design changes.

All of the base density tables 972, 972A, and 972B used to obtain the base density setting value may be stored in the storage 97 in advance, so that the user can select which table to use. The base density tables 972A and 972B may be conversion formulas or the like instead of tables, as long as the base density value can be obtained from the reference density value of the nail design.

The base density may be adjusted according to the (density of) color of the nail. Specifically, information on the color of the nail may be obtained from the nail image, and the base density may be changed based on this color information. For example, when the color of the nail is blackish (dark), the base density may be adjusted to be dark. This realizes the nail design with the suitable color tint that corresponds to the color of the nail.

In the embodiment, the user can change the density (application amount) of the base ink while looking at the previewed nail design. However, the user may be allowed to appropriately adjust (select) the density (application amount) of the base ink according to the nail design without depending on the preview display.

In the embodiment, white ink is used as the base ink. However, a base color other than white may be used. For example, an opaque color with white in it, such as light pink or light blue, can be used as the base color. In this case, the base density table has a base density setting value corresponding to the base color.

The embodiment takes, as an example, a case where the nail printing device 1 cooperates with the terminal device 9 to form a printing system, in which selecting of nail design etc. are performed on the terminal device 9, and the nail printing device 1 performs the printing operation. However, the nail printing device 1 is not limited to the device shown in the embodiment.

For example, the user may perform various operations using the operation unit and display of the nail printing device 1, and a control device of the nail printing device 1 may perform these processes. In such a configuration, the nail printing device 1 can be configured to complete printing operations on its own, without cooperating with the terminal device 9. In addition, the degree of cooperation (degree of sharing of processes) between the nail printing device 1 and the terminal device 9 may be changed from the degree of cooperation in the embodiment. For example, the terminal device 9 may perform most of the processes other than photographing and printing.

Various data such as nail designs, photographed nail images, and nail shape information may be stored in a storage of a terminal device or in a storage of the nail printing device 1.

Alternatively, the various data may be stored in a server device or the like that can be connected via a network line or the like, and the terminal device or the nail printing device 1 may be configured to access the server device or the like to refer to this data. In this way, it is possible to select a design to print from a larger number of nail designs.

Although several embodiments of the present disclosure have been described, the scope of the present disclosure is not limited to the above described embodiments and includes the scope of the present disclosure that is described in the claims and the equivalents thereof.

What is claimed is:
1. A printing system comprising:
   at least one processor; and
   a print head which performs printing on a printing target,
      wherein the processor
      sets an application amount of a base ink to be applied to the printing target according to a design to be printed on the printing target by the print head, and controls the print head to apply the base ink to the printing target based on the set application amount of the base ink, wherein the processor stores, in advance, a first base ink application amount table which associates a design which is each of at least one design with a base ink application amount setting value of the design, and acquires a base ink application amount setting value corresponding to the design to be printed on the printing target, based on the first base ink application amount table.

2. The printing system according to claim 1, wherein the processor selects the design based on a user operation, and sets the application amount of the base ink based on the selected design.

3. The printing system according to claim 1, wherein the processor changes the set application amount of the base ink based on a user operation in a state in which the design to be printed on the printing target is displayed, the displayed design having the base ink applied based on the set application amount of the base ink.

4. The printing system according to claim 1, wherein the processor acquires a density of the design to be printed on the printing target, and sets the application amount of the base ink based on the acquired density of the design.

5. The printing system according to claim 4, wherein the processor stores, in advance, a second base ink application amount table which associates a density of a design with a base ink application amount setting value, and acquires a base ink application amount setting value corresponding to the acquired density of the design, based on the second base ink application amount table.

6. The printing system according to claim 5, wherein the second base ink application amount table associates multiple design density values with multiple base ink application amount setting values, and the processor calculates, by linear interpolation, the base ink application amount setting value corresponding to a numerical value between adjacent design density values based on the second base ink application amount table.

7. The printing system according to claim 4, wherein the processor distributes the application amount of the base ink to multiple regions of the printing target according to a density distribution of the design.

8. A control method for a printing device which includes a print head which performs printing on a printing target, the control method comprising:

base ink application amount setting which is setting, by at least one processor of the printing device, an application amount of a base ink to be applied to the printing target according to a design to be printed on the printing target by the print head, and base printing which is controlling, by the processor, the print head to apply the base ink to the printing target based on the application amount of the base ink which is set in the base ink application amount setting, wherein the base ink application amount setting includes storing, in advance, a first base ink application amount table which associates a design which is each of at least one design with a base ink application amount setting value of the design, and the base printing includes acquiring a base ink application amount setting value corresponding to the design to be printed on the printing target, based on the first base ink application amount table.

9. A non-transitory computer readable storage medium storing a program for a printing device which includes a print head which performs printing on a printing target, the program causing a computer of the printing device to:

set an application amount of a base ink to be applied to the printing target according to a design to be printed on the printing target by the print head, and control the print head to apply the base ink to the printing target based on the set application amount of the base ink, wherein the program further causes the computer to store, in advance, a first base ink application amount table which associates a design which is each of at least one design with a base ink application amount setting value of the design, and acquire a base ink application amount setting value corresponding to the design to be printed on the printing target, based on the first base ink application amount table.

* * * * *